United States Patent [19]

Delgrosso et al.

[11] 4,010,530

[45] Mar. 8, 1977

[54] METHOD FOR MAKING BLADE PROTECTIVE SHEATHS

[75] Inventors: Eugene Joseph Delgrosso, Wallingford; Carl Edwin Carlson, East Hartford; James Augustus Jennings, West Suffield, all of Conn.

[73] Assignee: United Technologies Corporation, Hartford, Conn.

[22] Filed: July 24, 1975

[21] Appl. No.: 598,891

[52] U.S. Cl. .................. 29/156.8 B; 29/445; 228/160; 228/190; 228/194; 228/234; 228/263; 416/224

[51] Int. Cl.² ........................... B23P 15/04

[58] Field of Search .......... 228/160, 162, 190, 193, 228/194, 234, 263; 29/156.8 B, 156.8 H, 156.8 T, 445; 416/224

[56] References Cited

UNITED STATES PATENTS

| | | | |
|---|---|---|---|
| 2,615,236 | 10/1952 | Stulen et al. | 228/160 X |
| 2,851,770 | 9/1958 | Fromson | 228/160 X |
| 2,884,077 | 4/1959 | Stamm et al. | 29/156.8 H X |
| 3,002,567 | 10/1961 | Stulen et al. | 29/156.8 H X |
| 3,478,416 | 11/1969 | Hamilton | 228/194 |
| 3,670,397 | 6/1972 | Lewis | 228/193 |

OTHER PUBLICATIONS

Garrett et al., Broad Applications of Diffusion Bonding, N.A.S.A. CR409, Wash. D.C., Mar. 1966, p. 117.

*Primary Examiner*—Al Lawrence Smith
*Assistant Examiner*—K. J. Ramsey
*Attorney, Agent, or Firm*—John D. Del Ponti

[57] ABSTRACT

A method for producing a generally bifurcated metal protective sheath for the edge of an aerodynamic blade comprising the steps of (1) providing a metal sheath mid-section element having a top and bottom surface, (2) covering the top and bottom surface with an aluminum bonding material, (3) laying up separate metal top and bottom sheath cover elements on each of the top and bottom surfaces of the mid-section element to cover and overhang the same, the aluminum bonding material having a solidus temperature lower than the solidus temperatures of the mid-section element and the top and bottom cover elements, and (4) subjecting the layup to heat and pressure in a die for a time sufficient to bring the temperature of the bonding material to a temperature which is below but within approximately 20° F of its solidus temperature to solid state diffusion bond the mid-section and cover elements together without forming intermetallics.

6 Claims, 5 Drawing Figures

U.S. Patent  Mar. 8, 1977  4,010,530

METHOD FOR MAKING BLADE PROTECTIVE SHEATHS

BACKGROUND OF THE INVENTION

This invention relates to a method for producing a metal protective sheath for the edge of an aerodynamic blade and more particularly relates to a unique process for making such a sheath from multiple components for use on the edge of a high strength, high modulus, nonductile filament reinforced composite blade.

It is known to provide protection, particularly from foreign object impact damage, by providing a metal sheath to the leading edge of a gas turbine fan blade. Typically, such sheaths are made either by machining from a solid piece of metal or by brazing a plurality of components together with an appropriate braze alloy.

Machining a sheath is a costly and relatively inefficient procedure. However, recourse to other techniques, such as the use of brazing materials has been less than satisfactory since (1) the relatively high braze temperatures badly compromise or severely reduce the mechanical properties of the sheath and (2) with titanium or titanium alloy sheaths the use of titanium braze alloys may result in marked corrosion susceptibility.

SUMMARY OF THE INVENTION

It is an object of the present invention to provide a method for fabricating sheaths which is cost effective relative to conventional machining while preventing degradation of the mechanical properties of the sheath in comparison to customary brazing techniques.

In accordance with the present invention a unique method for producing a metal protective sheath adapted for the edge of a high strength, high modulus, nonductile filament reinforced composite blade is disclosed. The invention contemplates a technique wherein a sheath is made from a plurality of components by steps comprising (1) providing a metal sheath mid-section element having a top and bottom surface, (2) covering the top and bottom surface with an aluminum bonding material, (3) laying up a top and a bottom sheath cover element on the thus-covered surfaces, the aluminum bonding material having a solidus temperature which is lower than the solidus temperature of the mid-section element and the top and bottom cover elements, and (4) subjecting the layup to heat and pressure in a die sufficient to bring the temperature of the aluminum bonding material to a temperature which is below but within approximately 20° F of its solidus temperature to solid state diffusion bond the mid-section and cover elements without forming intermetallics.

Fabrication of multicomponent sheaths is achieved with metal components which provide a desirable balance of yield strength, ultimate tensile strength, ductility and impact energy absorption. Preferred are metals such as titanium or nickel or their alloys, most preferably titanium of the alpha-beta type and nickel of the Inconel type although various other metals are also considered satisfactory, such as for example, zirconium and its alloys, certain steels such as precipitation hardening stainless steels (e.g., PH 17-7, PH 17-4, AM 350, Custom 350 and the like) and ultra high-strength steels (e.g., D6AC, AISI 4340, 18 Ni maraging steel and the like) and the nickel or cobalt base superalloys (e.g., A-286, Inconel 625, HS-21 and the like). The bonding material is preferably aluminum and its alloys such as Aluminum Association Designation Nos. 1100, 3003 and 6061, although other aluminum alloys such as 2024, 7075 and the like are considered suitable.

Pursuant to the present invention, the materials are selected and the process is controlled to prevent the formation of intermetallics at the joint interface. One of the primary advantages of the process is that it permits a variety of sheath configurations, some of which are not attainable by other methods, without extensive machining, milling or other finishing operations. An added advantage of the inventive technique resides in the optional inclusion of joint materials different than the sheath members themselves, as desired. In addition, the process may be automated so that a continuous sheathing strip may be produced by incorporating the pressure bonding operation into a controlled rate, high pressure hot rolling procedure.

BRIEF DESCRIPTION OF THE DRAWINGS

An understanding of the invention will become more apparent to those skilled in the art by reference to the following detailed description when viewed in light of the accompanying drawings, wherein.

DESCRIPTION OF THE PREFERRED EMBODIMENTS

Figure 1:
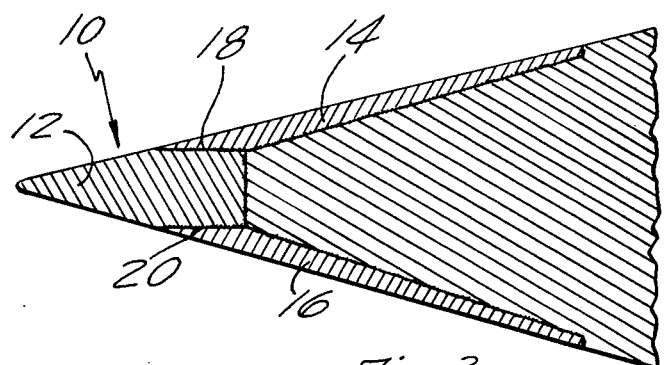
FIG. 1 is a top cross-sectional fragmentary view of a gas turbine engine blade having a metallic protective sheath along its leading edge.

In the inventive process, a three component generally U-shaped or bifurcated sheath is constructed by an activated bonding technique in which three separate components and associated bonding materials are positioned in a particular manner in a die prior to the application of heat and pressure in order to produce a sheath 10 as shown in FIG. 1. As illustrated therein, the end product sheath 10 is typically V-shaped and comprised of a V-shaped blade edge sheath portion 12 and two flat blade side sheath portions 14 and 16 each bonded to one side of the edge portion 12 by means of joints 18 and 20. It will be appreciated that in a sheath fabricated from plural components, a three component configuration is preferred in order that no joint will be located on the very blade edge.

Figure 2:
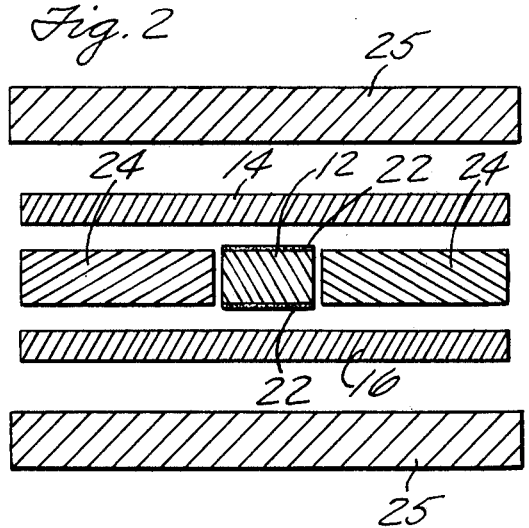
FIG. 2 is an exploded cross-sectional view of a stack of metal members between platen dies.

A typical sheath set up prior to compaction and bonding is illustrated in FIG. 2. According to the inventive technique, the sheath components and a bonding material 22 are positioned, in conjunction with spacers 24, in a die to obtain required curvature or flatness as desired. As shown therein, the sheath components are assembled between a pair of platen dies 25 which may be flat or curved to conform to the desired sheath configuration. The workpiece components comprise a metal mid-section element or edge sheath portion 12, a pair of top and bottom cover elements (side sheath portions) 14 and 16, aluminum bonding material 22 and spacers 24.

Figure 3:
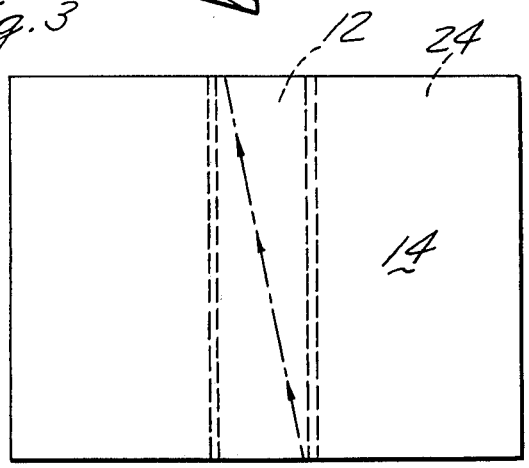
FIG. 3 is a top view of the components between the dies shown in FIG. 2.
Figure 4:
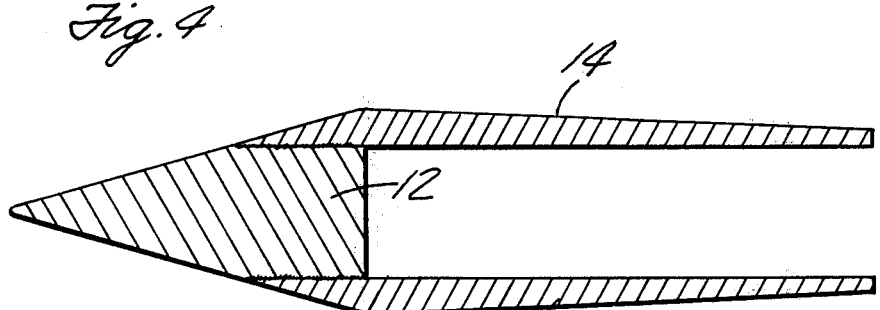
FIG. 4 is a cross-sectional view of a metallic protective sheath in an intermediate stage of manufacture.

In accordance with the invention, the sheath mid-section 12 is provided with the bonding material 22 on its entire upper and lower surface. Although the bonding alloy is preferably provided as a thin foil of aluminum or aluminum alloy such as 3003, 1100, 6061, 2024, 7075 or the like, it may be provided in any convenient form, e.g., as a sprayed, vapor deposited or sputter deposited layer of such alloy. The side sheath covers 14 and 16 are preferably of the same size, although they may differ, for example, in width. At any rate, both are of a greater width than the sheath mid-section 12 so that they provide overhanging portions extending beyond the sheath mid-section to form a channel in each of which is located a supporting spacer 24. The spacers are of a metal such as steel or titanium, are removable and provide support for the aforesaid overhanging portions during the hot press bonding operation. In order to prevent interaction with the sheath components, the spacers 24 are coated with a stop-off compound, such as colloidal graphite known commercially as DGF. Although spacers are preferably utilized, they are not required for every sheath configuration. In the configuration shown, provision is made for making two sheaths at one time since, as best shown in FIG. 3, after assemblage and bonding, the H-shaped product is cut (as, for example, along the line of arrows) through the sheath mid-section to form two essentially U-shaped or bifurcated products which may then be machined to the intermediate shape of FIG. 4 and then bonded to the blade. As shown in that drawing, the edge portion 12 is machined to a leading edge configuration while the side portions are tapered by the chem-milling of their outer surfaces. It will be recognized, of course, that the side sheath portions may be provided with the desired taper prior to their layup and bonding between the dies 25.

The sheath materials 12, 14 and 16 may consist of any desired metal which provides the requisite balance of yield strength, ultimate tensile strength, ductility and impact energy absorption. As indicated above, the preferred metals are titanium, nickel or alloys thereof although other metals such as precipitation hardening stainless steels, ultra high-strength steels, or the nickel and cobalt base superalloys are considered suitable. Thickness is not crictical and varies of course, with end application. Typically, for use on fan blades or vanes in engines of fighter type aircraft, the sheath members 12, 14 and 16 have a thickness ranging from 2–30 mils but may be thicker if used on the engines for the larger "jumbo" size airplanes such as the Boeing 747, the Lockheed L-1011 or the McDonnell Douglas DC-10. The aluminum bonding material may likewise vary in thickness, typically however ranging in size from 1–20 mils, preferably 2–3 mils in thickness. The bonding material may be aluminum or any aluminum alloy as described above.

Once the components described are assembled, they are hot press solid state diffusion bonded by a technique in which care is taken to insure that little or no intermetallic is formed. Intermetallics cause generally lower fatigue strength and are thus undesirable. As a first step in the process after assembly, the platen dies are put into contact pressure with the assemblage (e.g., at 50–200 psi) and heat is applied until a temperature of approximately 900°–1,075° F, preferably 990°–1,050° F, is achieved. At that time, full pressure ranging from 1,000–10,000 psi, preferably 5,000–6,000 psi, is applied for 2–90 minutes, preferably 10–40 minutes, and most preferably 12–35 minutes. Of course, the time at temperature and pressure will vary — the higher the temperature, the shorter the residence time. The key aspect with regard to the above process technique is that the temperature is selected to promote a solid state diffusion bond without the formation of intermetallics. As will be appreciated, intermetallics will form if residence time at temperature is too long or if the temperature is too high whereby the bonding metal becomes liquid. The hot pressing operation is performed preferably in a vacuum or protective atmosphere such as argon although it may also be done in air. After hot pressing, the pressure is maintained while the workpiece cools for approximately 0.1–10 hours.

After cooling, the workpiece is removed from the die, the spacers 24 are removed from between overhanging portions of sheath members 14 and 16 and the article is severed into generally U-shaped or bifurcated sheath members by cutting down through the three sheath components along their length by suitable means such as a cutoff wheel or the like. The bifurcated member is then machined or milled to shape.

The metal sheath produced by the present invention finds especial application on the leading edge of those composite blades comprising metal or resin matrix materials reinforced with high modulus, high strength filaments of materials such as boron, silicon carbide, silicon carbide coated boron, boron carbide, alumina or carbon or graphite. Reference is made, for example, to the composite blade described in U.S. Pat. No. 3,600,103 to Gray, of common assignee as the present invention.

Figure 5:
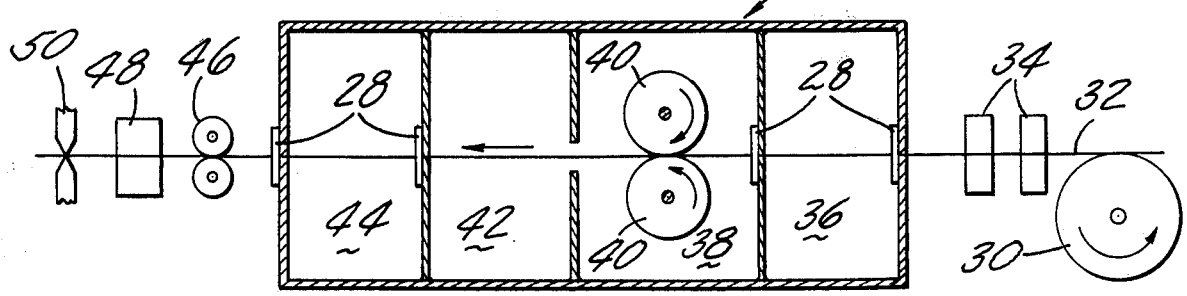
FIG. 5 is a cross-sectional view of automated sheath processing apparatus.

In FIG. 5, the inventive process is shown in an automated mode. In particular, instead of hot pressing by means of platen dies as described hereinbefore, the diffusion bond is accomplished by hot rolling. As illustrated, a vacuum chamber 26 having conventional vacuum locks 28 is provided. A supply roll 30 furnishes a continuous composite assembly 32 of the three sheath components 12, 14 and 16, the bonding material 22 and even the spacers 24. The tape assembly passes through a pair of alignment dies 34 into a preheat vacuum chamber 36 where the tape is heated to a temperature of 900° F. The tape then passes into a bonding vacuum it 38 where is is diffusion bonded by passage between a pair of heated rollers 40. The bonded tape next passes into post-heat diffusion chamber 42 where temperature is maintained at approximately 900° F and thence into cooling chamber 44. Gripping rollers 46 and jaws 48 on the downstream side of chamber 26 keep tension on the tape 32 during the entire operation while flying cutter 50 is set up to sever the bonded tape into desired lengths.

In one series of investigations, the tensile shear strengths of the joints of a number of different sheaths fabricated using apparatus shown in FIGS. 2 and 3 in accordance with this disclosure were evaluated. A compilation of these strengths is set forth in the following table:

Table I

SHEATH JOINT TENSILE STRENGTH

| Sheath Components Side Components/Edge Component | Al Bond Material | Al Bond Foil Thick. Mils | Process Parameters | | | Shear Strength, PSI |
|---|---|---|---|---|---|---|
| | | | °F | Time Min. | PSI | |
| Ti-6Al-4V/Inconel 625 | 3003 | 12 | 1050 | 10 | 1000 | 5,356 |
| Ti-6Al-4V/Inconel 625 | 3003 | 6 | 1050 | 16 | 2000 | 5,349 |
| Ti-6Al-4V/Inconel 625 | 3003 | 6 | 1050 | 18 | 2000 | 7,878 |
| Ti-6Al-4V/Inconel 625 | 3003 | 6 | 1050 | 18 | 2000 | 6,777 |
| Ti-6Al-4V/Inconel 625 | 6061 | 6 | 1030 | 12 | 2000 | 4,154 |
| Ti-6Al-4V/Inconel 625 | 6061 | 20 | 990 | 24 | 5000 | 11,138 |
| Inconel 625/625 | 6061 | 6 | 1000 | 26 | 5000 | 4,468 |
| Inconel 625/625 | 6061 | 6 | 995 | 30 | 2000 | 2,655 |
| Inconel 625/625 | 3003 | 6 | 1025 | 30 | 5000 | 4,450 |
| Ti-6Al-4V/Ti-6Al-4V | 6061 | 6 | 1050 | 30 | 5000 | 12,845 |
| Ti/Ti | 6061 | 6 | 1030 | 34 | 5000 | 13,705 |
| Ti/Ti | 6061 | 6 | 1030 | 32 | 2000 | 13,130 |
| Ti-6Al-4V/Ti-6Al-4V | 3003 | 6 | 1050 | 30 | 5000 | 11,807 |
| Ti-6Al-4V/Ti-6Al-4V | 3003 | 2 | 1050 | 30 | 5000 | 13,860 |
| Ti/Ti | 3003 | 2 | 1050 | 30 | 5000 | 14,188 |

What has been set forth above is intended primarily as exemplary to enable those skilled in the art to practice the invention and it should therefore be understood that, within the scope of the appended claims, the invention may be practiced in ways other than as specifically described.

I claim:

1. A method for protecting the edge of an aerodynamic blade comprising:

providing a metal sheath mid-section element having a top and a bottom surface, said mid-section element being selected from the group consisting of titanium, nickel and alloys thereof;

covering said top and bottom surface with an aluminum bonding material;

laying up a metal top and bottom sheath cover element on each of said top and bottom surfaces of said mid-section element, said top and bottom cover elements being selected from the group consisting of titanium, nickel and alloys thereof and having contact surfaces wider than said top and bottom surfaces of said sheath mid-section element to overhang opposite sides of the same and thereby form channels adapted to receive the edge of said blade;

said aluminum bonding material having a solidus temperature which is lower than the solidus temperature of each of said mid-section element and said top and bottom cover elements;

subjecting the layup to heat and pressure in a die for a time sufficient to bring the temperature of said bonding material to a temperature which is below but within approximately 20° F of its solidus temperature to solid state diffusion bond said mid-section and cover elements together without forming intermetallics, said temperature being 900°–1075° F, said pressure being 1,000–10,000 psi and said time being 2–90 minutes;

severing the bonded product through said top surface, said mid-section element and said bottom surface to form two U-shaped protective sheaths;

finishing said U-shaped protective sheath to final shape; and bonding said U-shaped protective sheath to said blade edge.

2. The method of claim 1 including the step of inserting a spacer in said channel adjacent said mid-section element to support overhanging portions of said top and bottom cover elements during solid state diffusion bonding.

3. The method of claim 2 including the step of coating said spacer with a stop-off compound.

4. The method of claim 1 wherein said temperature is 990°–1,050° F, said pressure is 5,000–6,000 psi and said time is 10–40 minutes.

5. The method of claim 4 wherein said time is 12–35 minutes.

6. The method of claim 1 wherein said aluminum bonding alloy is 1–20 mils thick.

* * * * *

UNITED STATES PATENT OFFICE
CERTIFICATE OF CORRECTION

PATENT NO. : 4,010,530
DATED : March 8, 1977
INVENTOR(S) : Eugene J. Delgrosso, Carl E. Carlson, James A. Jennings It is certified that error appears in the above-identified patent and that said Letters Patent are hereby corrected as shown below:

Column 1, line 52    after "elements" should appear -- together --

Column 4, line 23    after "into" should appear -- two --

Column 4, line 53    "it" should be deleted and -- chamber -- should be inserted Column 4, line 53    "is", first occurrence, should read -- it --

Signed and Sealed this fifth Day of July 1977

[SEAL]

Attest:

RUTH C. MASON
*Attesting Officer*

C. MARSHALL DANN
*Commissioner of Patents and Trademarks*